United States Patent
Peng et al.

(10) Patent No.: US 12,439,511 B2
(45) Date of Patent: Oct. 7, 2025

(54) INPUT DEVICE

(71) Applicant: Quanta Computer Inc., Taoyuan (TW)

(72) Inventors: Xiang-Lan Peng, Taoyuan (TW);
Tzu-Lin Chai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 206 days.

(21) Appl. No.: 18/508,332

(22) Filed: Nov. 14, 2023

(65) Prior Publication Data
US 2025/0120013 A1  Apr. 10, 2025

(30) Foreign Application Priority Data
Oct. 5, 2023  (TW) .................................. 112210772

(51) Int. Cl.
| | | |
|---|---|---|
| *H05K 1/02* | (2006.01) | |
| *G06F 3/01* | (2006.01) | |
| *G06F 3/02* | (2006.01) | |
| *G06F 3/03* | (2006.01) | |

(52) U.S. Cl.
CPC ........... *H05K 1/0284* (2013.01); *G06F 3/014* (2013.01); *G06F 3/02* (2013.01); *G06F 3/0304* (2013.01); *H05K 1/028* (2013.01)

(58) Field of Classification Search
CPC ...... H05K 1/0284; H05K 1/028; G06F 3/014; G06F 3/02; G06F 3/0304
USPC ........................................................... 361/749
See application file for complete search history.

(56) References Cited

U.S. PATENT DOCUMENTS

| | | | | |
|---|---|---|---|---|
| 5,453,759 | A * | 9/1995 | Seebach | G06F 3/011 345/158 |
| 2009/0073122 | A1* | 3/2009 | Hou | G06F 3/03547 345/163 |
| 2009/0179854 | A1* | 7/2009 | Weber | G06F 1/1626 345/156 |

* cited by examiner

*Primary Examiner* — Binh B Tran
(74) *Attorney, Agent, or Firm* — McClure, Qualey & Rodack, LLP

(57) ABSTRACT

An input device is provided, including a housing, a circuit board disposed in the housing, an optical module disposed on the circuit board, a movable member movably connected to the housing, and a switch element disposed on the circuit board. When the input device moves to a reference surface, the movable member contacts the reference surface, and the movable member is pushed by the reference surface to actuate the switch element.

10 Claims, 16 Drawing Sheets

INPUT DEVICE

CROSS REFERENCE TO RELATED APPLICATIONS

This Application claims priority of Taiwan Patent Application No. 112210772, filed on Oct. 5, 2023, the entirety of which is incorporated by reference herein.

BACKGROUND OF THE INVENTION

Field of the Invention

The present invention relates to an input device, and, in particular, to a wireless ring mouse.

Description of the Related Art

Conventional laptop computers usually have a touchpad. However, many people are still more comfortable using a mouse as an input device. Regular mouse devices have problems such as their large size, and they are not convenient to carry.

When computer users are operating a computer, the palm of the hand often needs to move between the keyboard and mouse of the laptop, causing inconvenience in use. Additionally, the risk of developing Carpal Tunnel Syndrome (CTS) may also increase after regular use of a mouse device for a long time. Therefore, designing a mouse device that is convenient to use has been a challenge.

BRIEF SUMMARY OF THE INVENTION

An embodiment of the present invention provides an input device that includes a housing, a circuit board disposed in the housing, an optical module disposed on the circuit board, and a movable member movably disposed in the housing.

The optical module is configured to detect the displacement of the input device relative to a reference surface. The movable member protrudes from an outer surface of the housing.

The switch element is disposed on the circuit board, wherein when the input device moves toward the reference surface and the movable member presses the reference surface, the movable member is pushed by the reference surface into the housing to actuate the switch element.

The input device as claimed in claim 1, further comprising a support, wherein the circuit board forms a triangular space for receiving the support.

In some embodiments, the circuit board has a curved first segment, a curved second segment, a third segment, a fourth segment, a fifth segment and a sixth segment, the third segment is connected between the first and second segments, the fourth segment is connected between the third and fifth segments, and the sixth segment is connected to the fifth segment, wherein the triangular space is formed between the third, fourth, and fifth segments.

In some embodiments, the sixth segment is parallel to the fifth segment, and the input device further comprises a buffer disposed between the fifth and sixth segments.

In some embodiments, the support has a recessed portion for receiving the fourth segment of the circuit board.

In some embodiments, the support further has two first joining portions, and the housing has two second joining portions respectively joined with the first joining portions, wherein the recessed portion is formed between the two first joining portions.

In some embodiments, the circuit board comprises a flexible printed circuit board.

In some embodiments, the optical module has an optical axis, and when viewed along the optical axis, the switch element overlaps the optical module.

In some embodiments, the housing forms a through hole, and the outer surface is angled relative to a central axis of the through hole.

In some embodiments, the input device further includes a C-shaped battery disposed in the housing and electrically connected to the circuit board.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the input device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
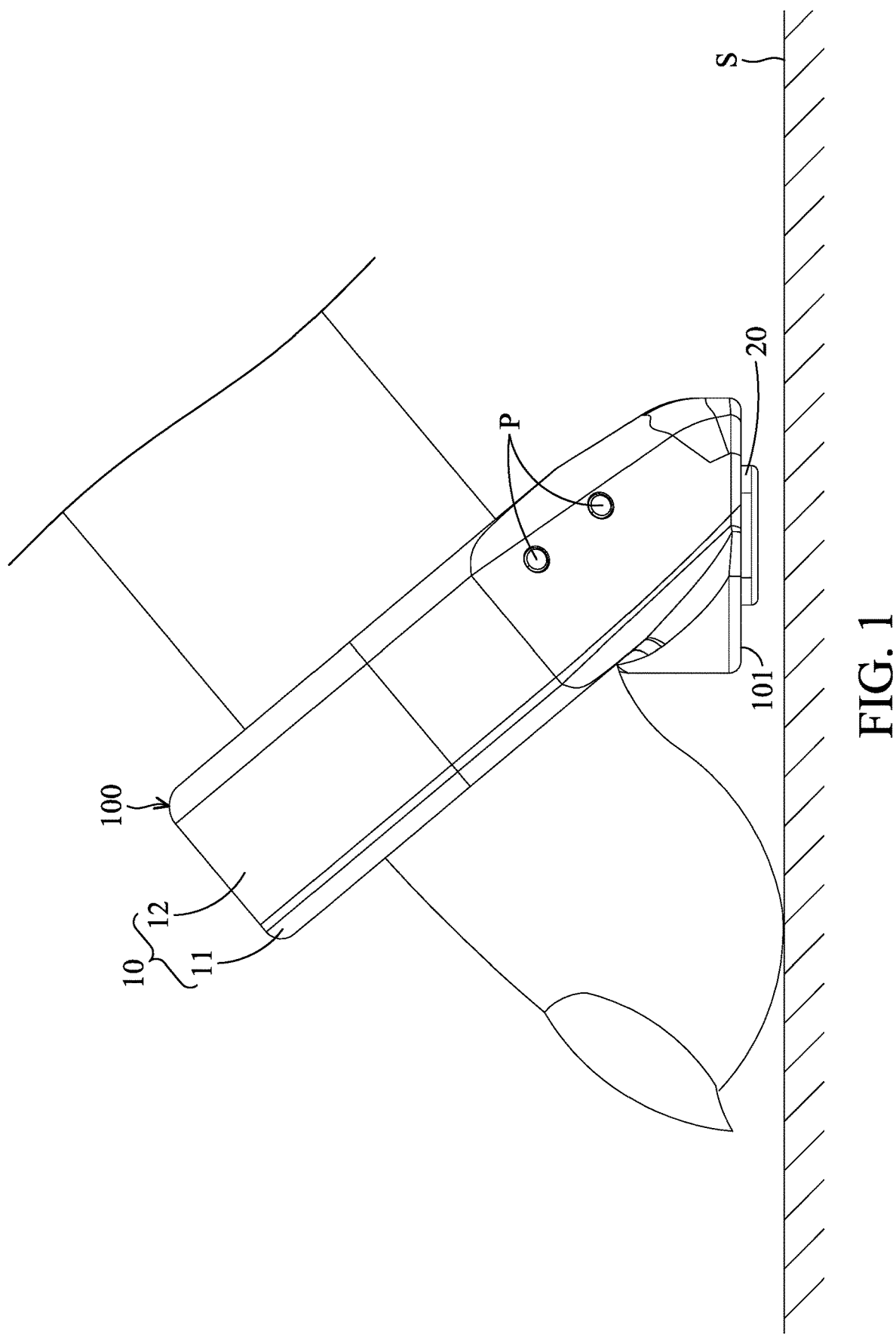
FIG. 1 is a schematic diagram of an input device 100 worn on a finger F of the user, in accordance with an embodiment of the invention.
Figure 2:
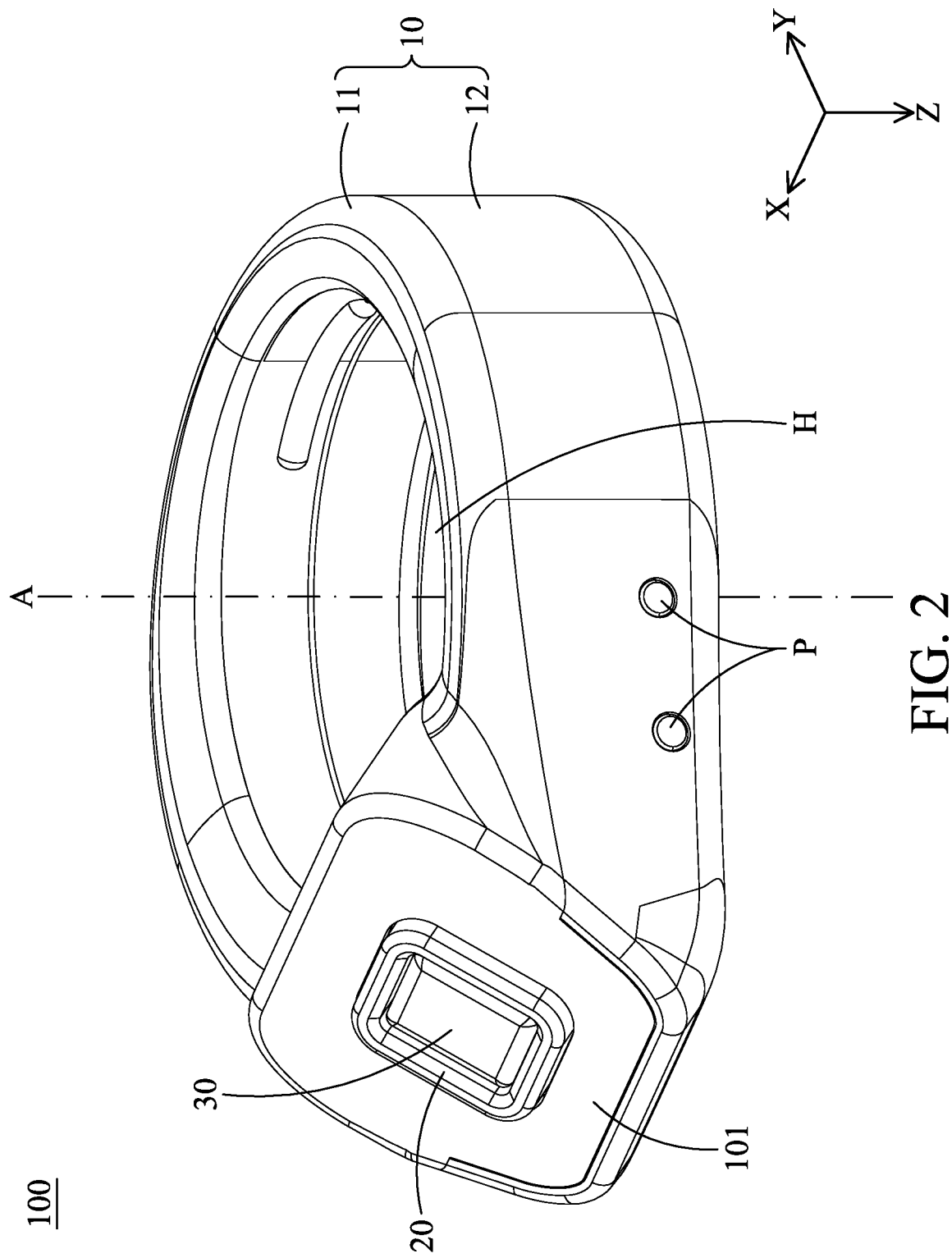
FIGS. 2-4 are perspective diagrams of the input device 100 in FIG. 1.
Figure 3:
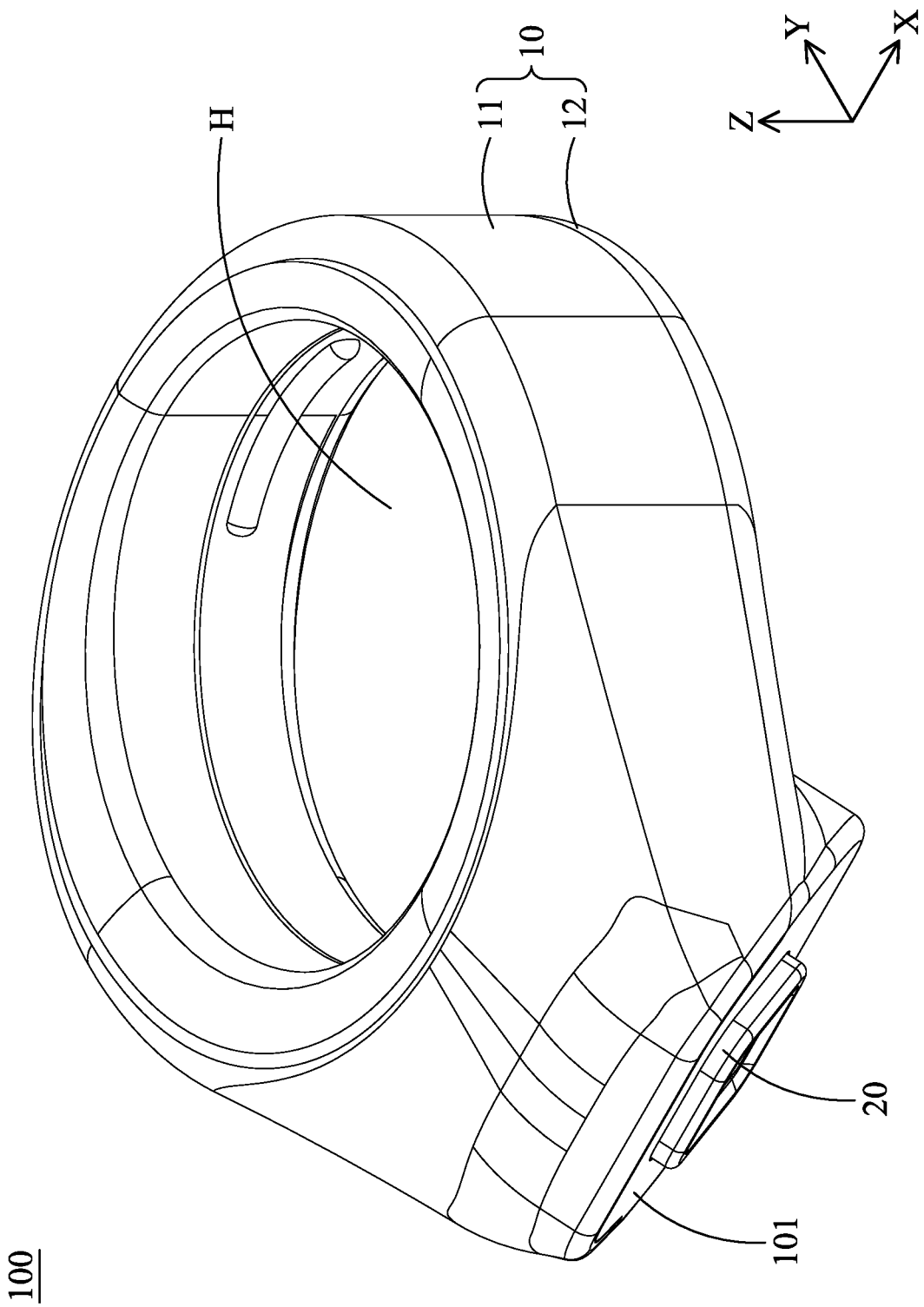
Figure 4:
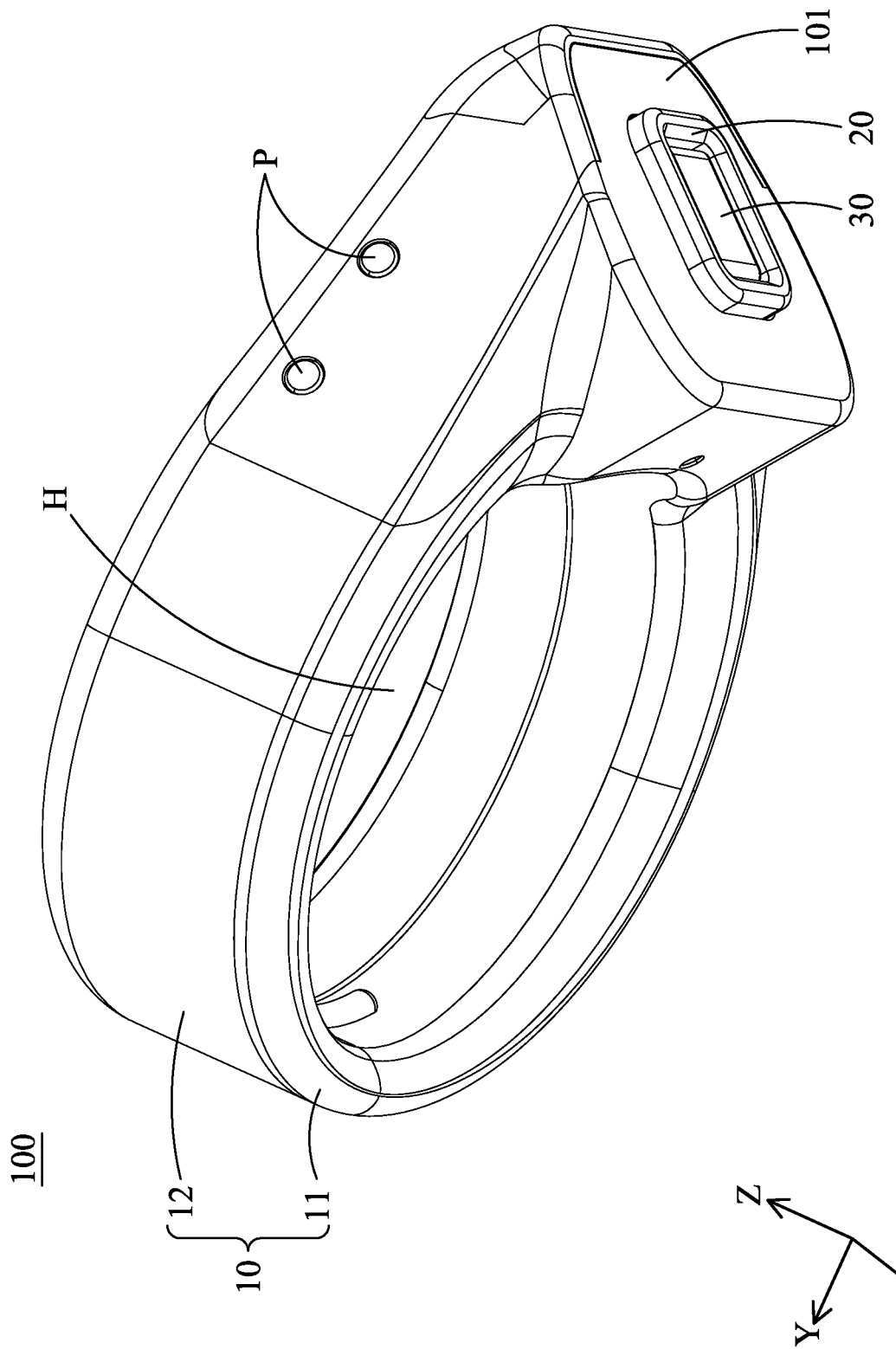

FIG. 1 is a schematic diagram of an input device 100 worn on a finger F of the user, in accordance with an embodiment of the invention. FIGS. 2-4 are perspective diagrams of the input device 100 in FIG. 1.

The input device 100 in FIGS. 1-4 is a wireless mouse that can be worn on the finger F. In this embodiment, the input device 100 can be used as a regular mouse to click buttons or move a cursor on a computer screen.

The input device 100 comprises a housing 10 that has a first frame 11 and a second frame 12. A hollow movable member 20 and an optical module 30 are disposed on the outer surface 101 of the first frame 11, and the optical module 30 is affixed in the movable member 20.

When the input device 100 moves along with the finger of the user above the reference surface S (e.g. table surface) as shown in FIG. 1, the optical module 30 (e.g. laser transceiver) can receive the sensing light that is reflected by the reference surface S, so as to determine the displacement of the input device 100 relative to the reference surface S. Therefore, the input device 100 can be used as an optical mouse to move a cursor on a computer screen.

Still referring to FIGS. 1-4, the input device 100 has an annular structure that forms a through hole H and can be worn on the finger pulp of the distal phalange (or other phalange) of the index finger during usage. The user can type on the keyboard with fingertips and perform the mouse functions (e.g. moving the cursor, clicking the left, middle, right button, scrolling up/down, selection, or dragging) easily with the finger pulp of the index finger at the same time. Hence, there is no need to move the user's hand between the touchpad (keyboard) and the regular mouse device whereby convenient and comfortable use can be achieved, and the risk of Carpal Tunnel Syndrome (CTS) can be efficiently reduced.

Moreover, as the input device 100 has lightweight and compact size, it is extremely portable and easy to use. In some embodiments, the input device 100 can be accommodated in the laptop computer for space-saving and prevented from being lost, and it is therefore convenient to use. Additionally, to achieve miniaturization of the laptop computer, the touchpad on the laptop computer can be replaced by the input device 100 to reduce the dimensions of the laptop computer or save more space for the batteries.

It can be seen in FIG. 2 that the outer surface 101 is angled relative to the central axis A of the through hole H. Here, the included angle between the outer surface 101 and the central axis A is ranged from 30 to 50 degrees (e.g. 40 degrees). In this embodiment, two conductive terminals P are exposed to a side of the second frame 12, and they can be electrically connected to an external power supply via a conductive wire (not shown).

Figure 5:
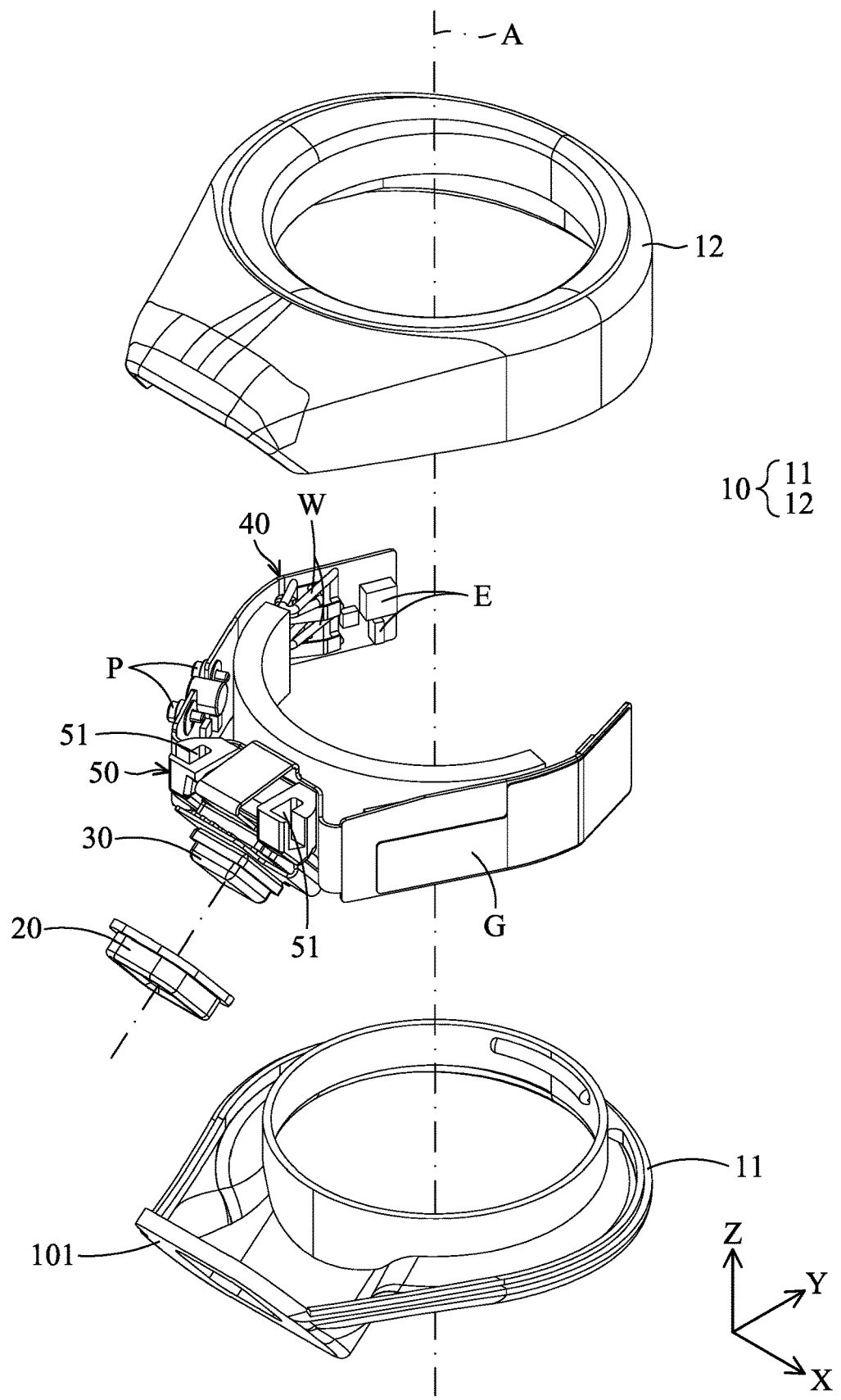
FIG. 5 is an exploded view of the input device 100 in FIGS. 1-4.
Figure 6:
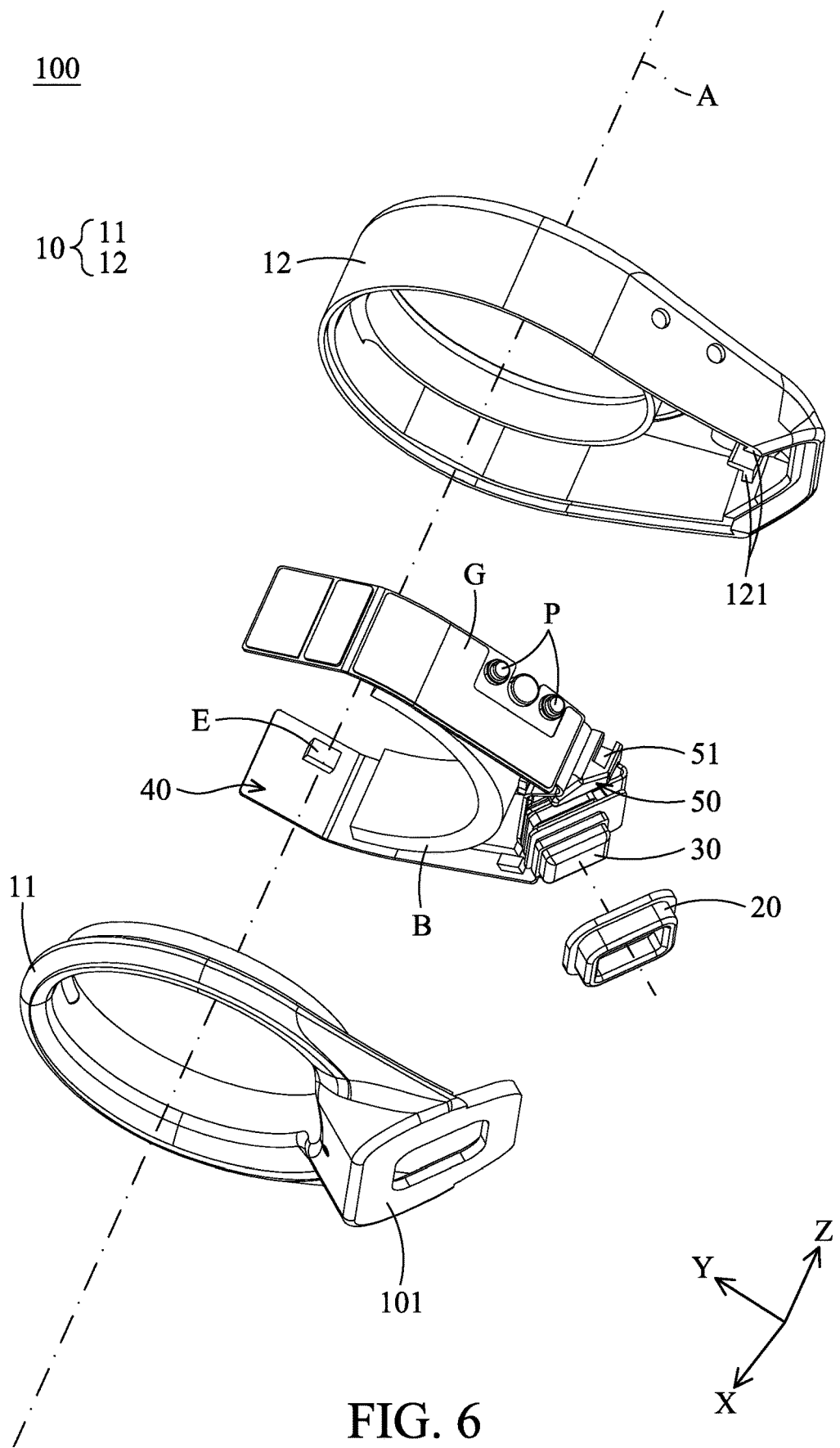
FIG. 6 is another exploded view of the input device 100 in FIGS. 1-4.
Figure 7:
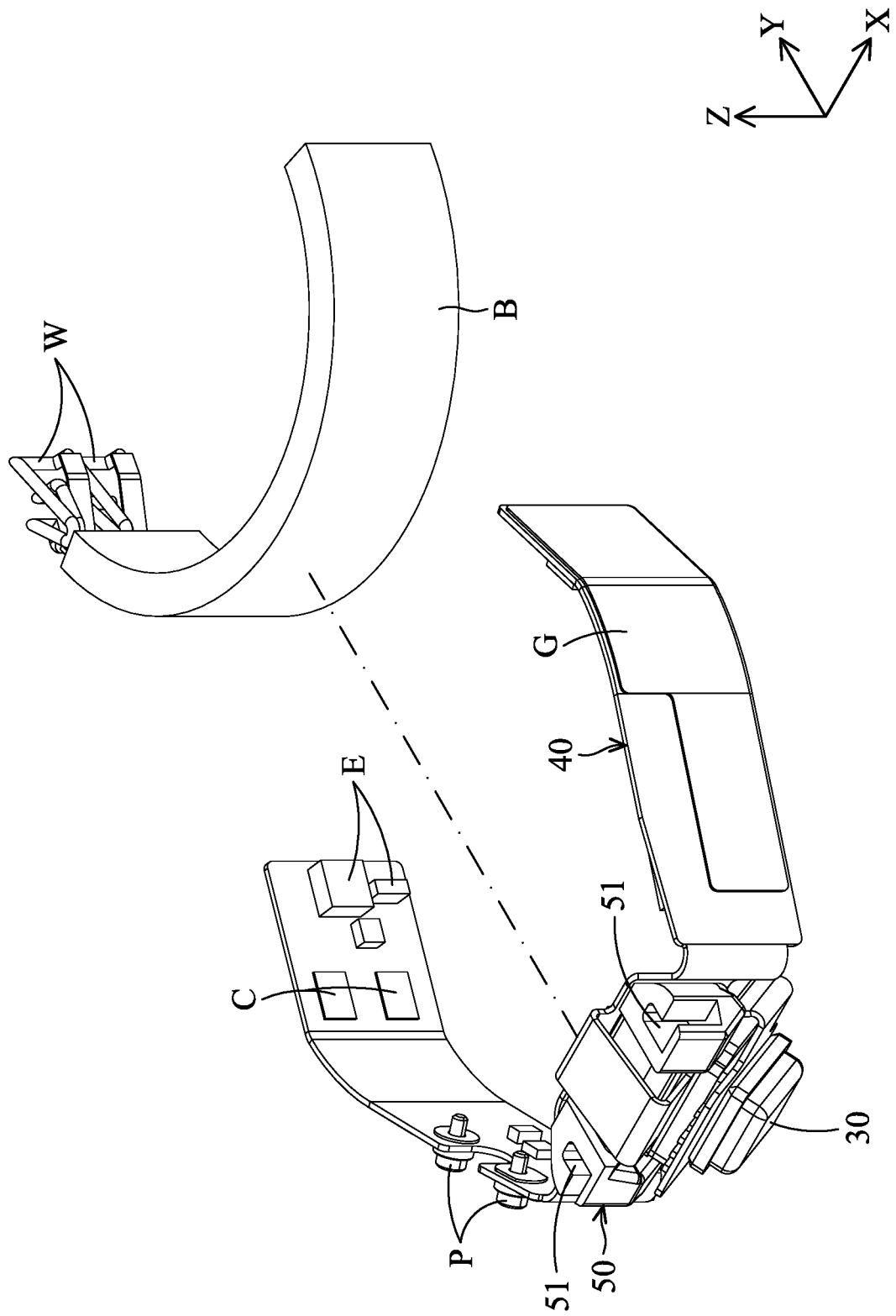
FIG. 7 is an exploded view of the battery B and the circuit board 40 in FIG. 5 before assembly.
Figure 8:
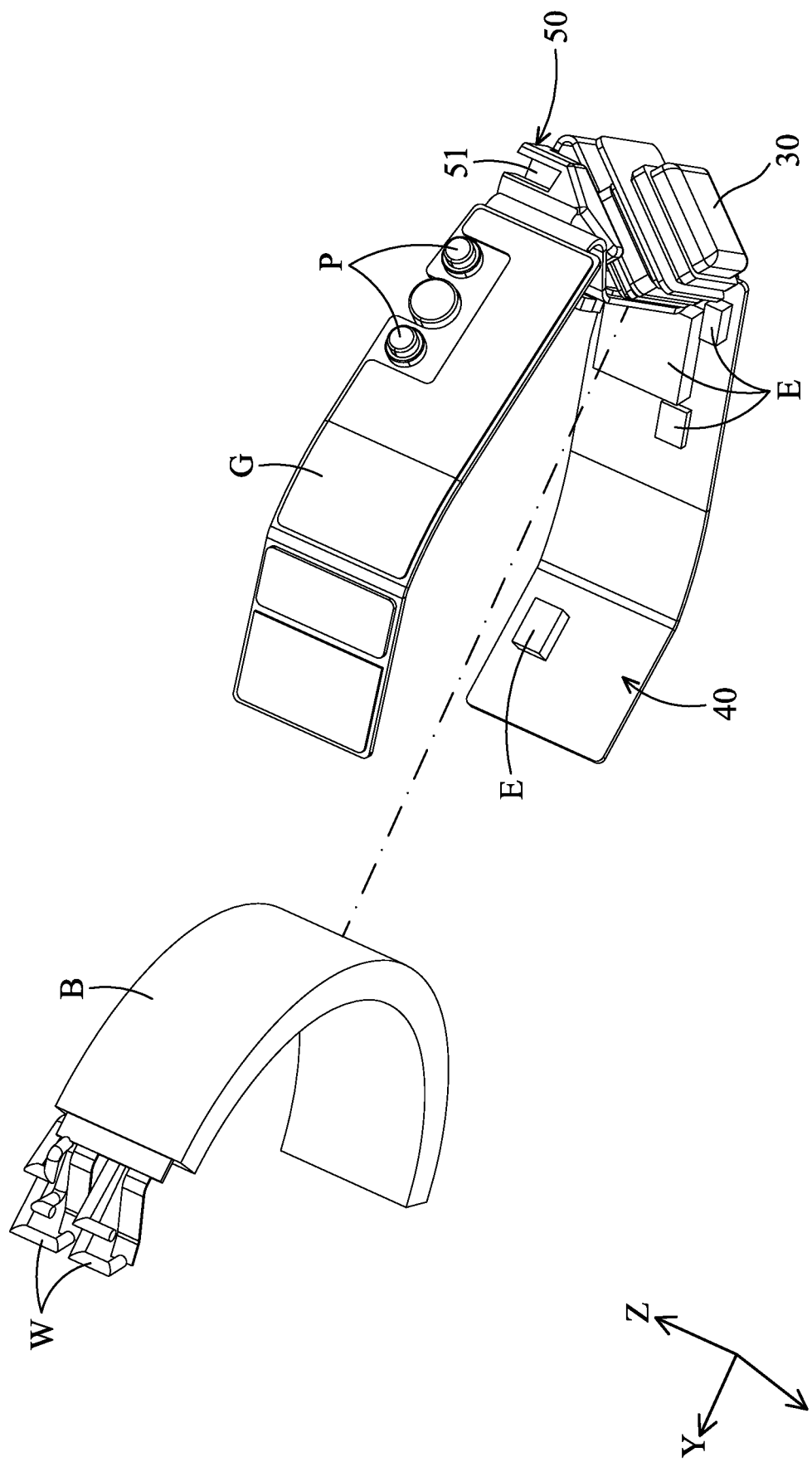
FIG. 8 is an exploded view of the battery B and the circuit board 40 in FIG. 6 before assembly.

FIG. 5 is an exploded view of the input device 100 in FIGS. 1-4. FIG. 6 is another exploded view of the input device 100 in FIGS. 1-4. FIG. 7 is an exploded view of the battery B and the circuit board 40 in FIG. 5 before assembly. FIG. 8 is another exploded view of the battery B and the circuit board 40 in FIG. 6 before assembly.

Referring to FIGS. 5-8, a C-shaped circuit board 40, a support 50, and the optical module 30 are disposed in the housing 10 of the input device 100. The conductive terminals P and the optical module 30 are disposed on the circuit board 40, and the support 50 is surrounded by the circuit board 40.

Here, the circuit board 40 may comprise a flexible printed circuit board, and the support 50 may comprise a metal block, but the invention is not limited to the embodiments described above.

It can be seen in FIGS. 5-8 that the support 50 has two first joining portions 51 (e.g. recesses), and the second frame 12 of the housing 10 has two second joining portions 121 (e.g. protrusions). During assembly, the second joining portions 121 are respectively joined with the first joining portions 51, whereby the circuit board 40 and the support 50 can be firmly affixed in the housing 10.

Additionally, several electronic elements E (e.g. CPU, memories, communication ICs, or passive components) are disposed on the inner surface of the circuit board 40, and a battery B is electrically connected to the contact pads C (FIG. 7) on the circuit board 40 via the conductive elements W. Therefore, the battery B can supply power to the electronic elements E and the optical module 30 on the circuit board 40. In this embodiment, the battery B has a C-shaped structure.

It should be noted that the adhesive G (e.g. glue or double-sided tape) may be provided on the outer surface of the circuit board 40, whereby the circuit board 40 can be firmly adhered to the inner surface of the first frame 11 and/or the second frame 12 during assembly. Therefore, the connection strength between the circuit board 40 and the housing 10 can be enhanced, and the reliability and durability of the input device 100 can also be increased.

Figure 9:
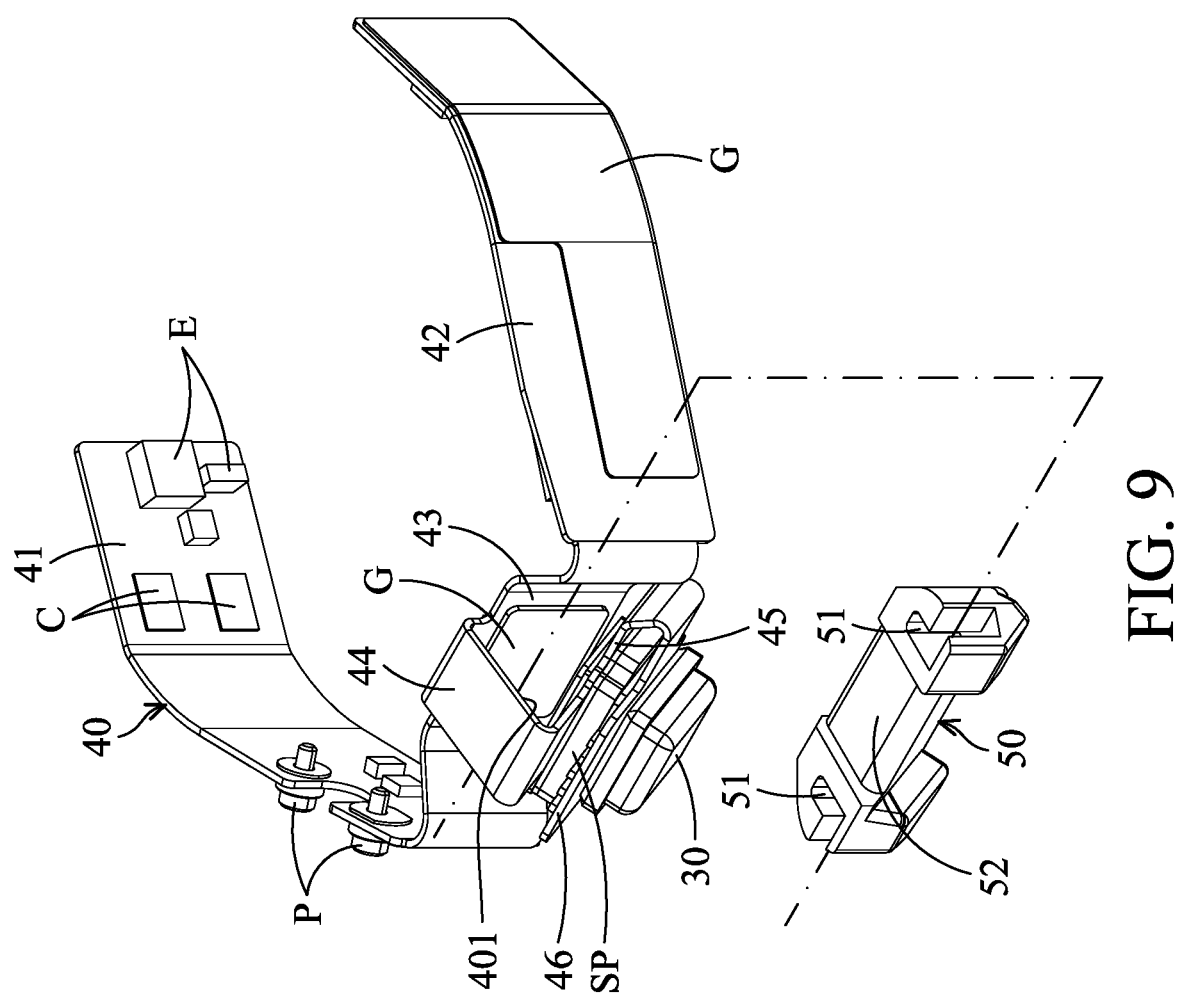
FIG. 9 is an exploded view of the circuit board 40 and the support 50 in FIG. 7 before assembly.
Figure 10:
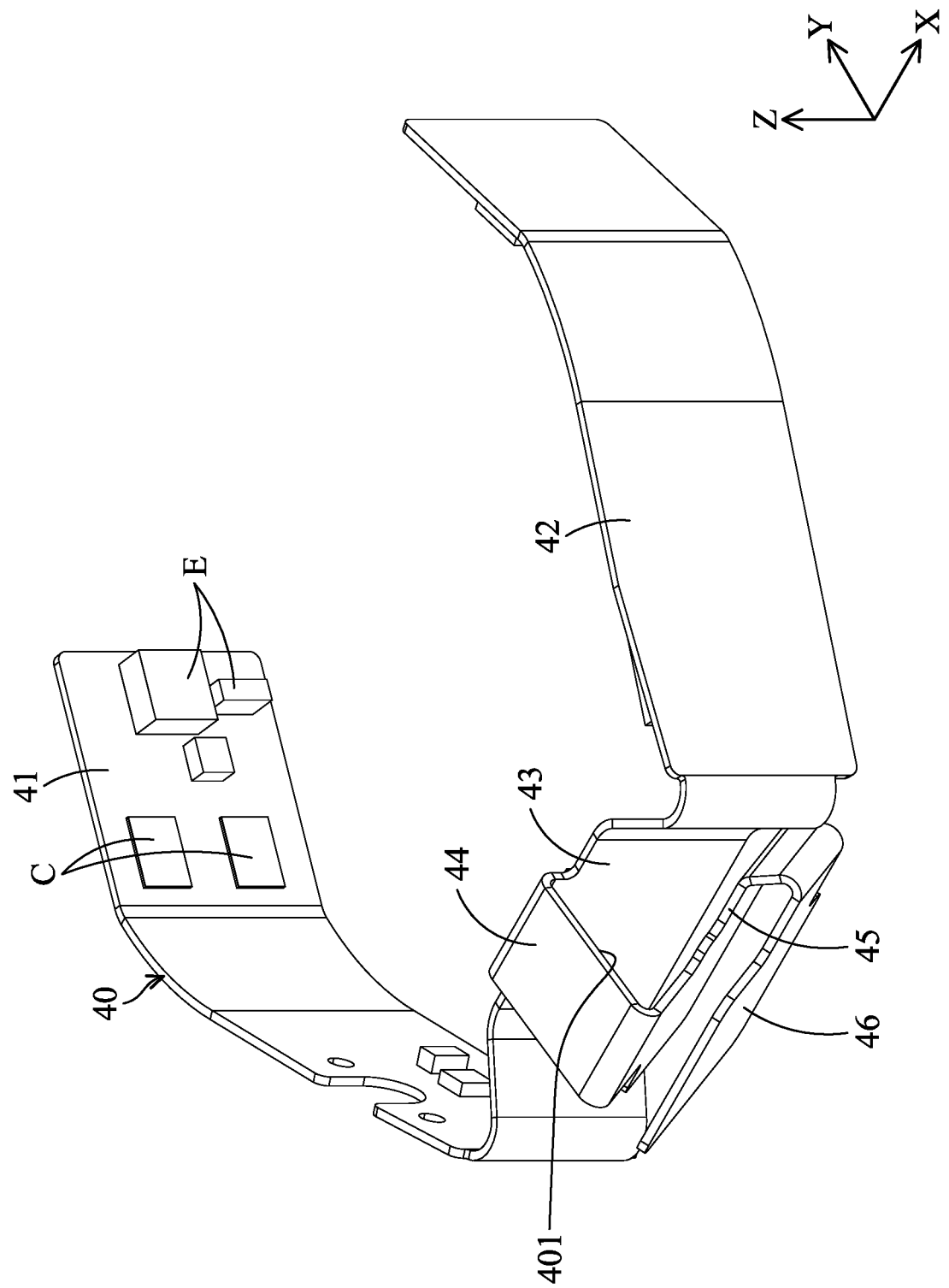
FIG. 10 is a perspective diagram of the circuit board 40, wherein a triangular space 401 is formed between the third, fourth, and fifth segments 43, 44, and 45.

FIG. 9 is an exploded view of the circuit board 40 and the support 50 in FIG. 7 before assembly. FIG. 10 is a perspective diagram of the circuit board 40, wherein a triangular space 401 is formed between the third, fourth, and fifth segments 43, 44, and 45.

Referring to FIGS. 9 and 10, the circuit board 40 primarily comprises a curved first segment 41, a curved second segment 42, a third segment 43, a fourth segment 44, a fifth segment 45, and a sixth segment 46. The third segment 43 is substantially parallel to the central axis A (Z direction) of the through hole H and is connected between the first and second segments 41 and 42.

Moreover, as shown in FIG. 9, the sixth segment 46 is parallel to the fifth segment 45, and they are connected to each other. Specifically, a buffer SP is disposed between the fifth and sixth segments 45 and 46.

The fourth segment 44 is connected between the third and fifth segments 43 and 45, and a triangular space 401 is formed between the third, fourth, and fifth segments 43, 44, and 45 for receiving the support 50. It can be seen in FIG. 9 that a recessed portion 52 is formed between the two first joining portions 51. During assembly, the fourth segment 44 of the circuit board 40 can be positioned in the recessed portion 52, as shown in FIG. 7, thereby preventing the support 50 from sliding out of the space 401.

In FIG. 9, the adhesive G (e.g. glue or double-sided tape) is disposed on the third segment 43 to adhere the circuit board 40 to the support 50, thereby firmly securing the support 50 in the space 401 of the circuit board 40.

Figure 11:
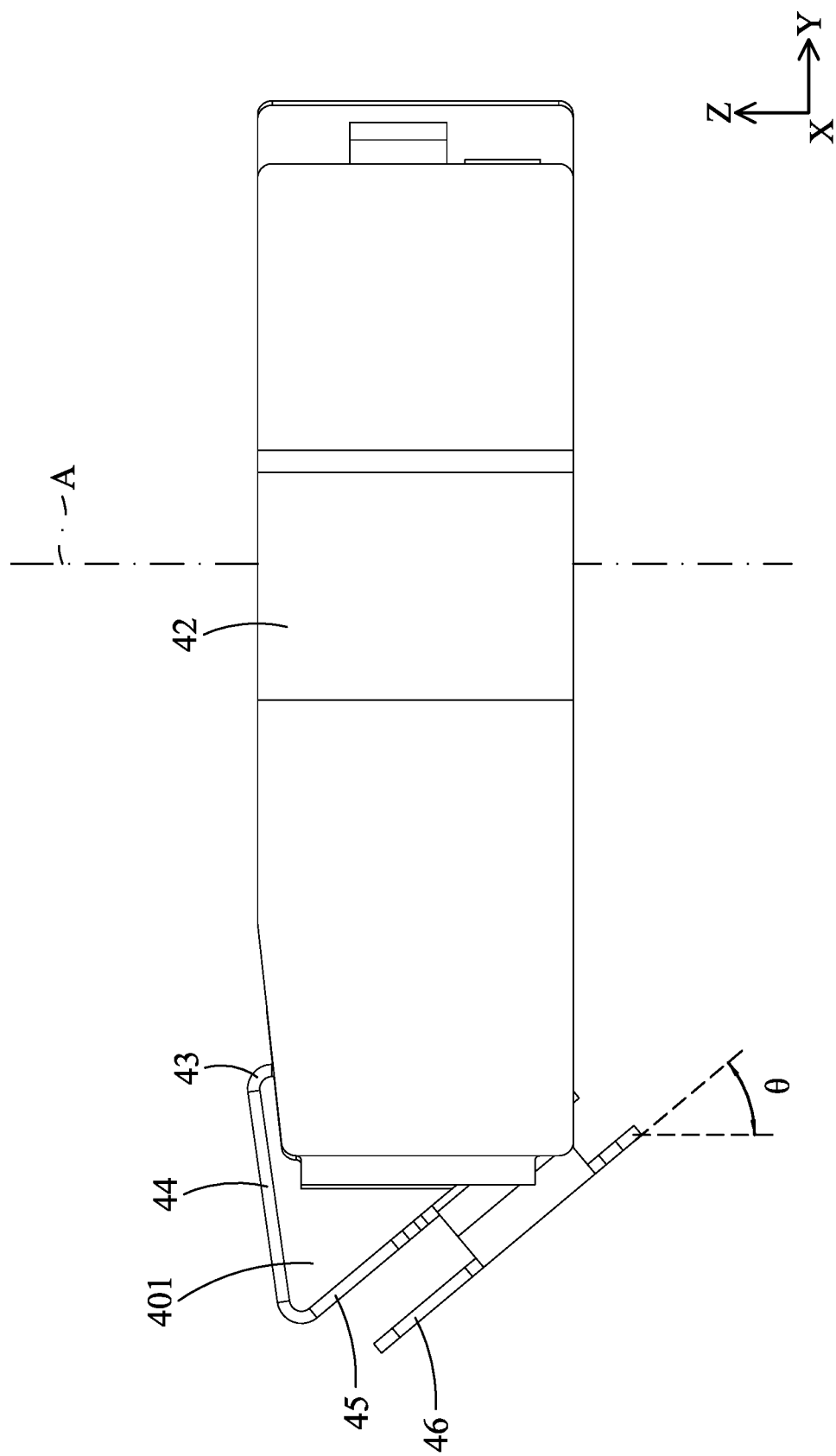
FIG. 11 is a side view of the circuit board 40, wherein the fifth and sixth segments 45 and 46 has a tilt angle θ relative to the central axis A of the through hole H.

FIG. 11 is a side view of the circuit board 40, wherein the fifth and sixth segments 45 and 46 have a tilt angle θ relative to the central axis A of the through hole H.

Referring to FIG. 11, the fifth and sixth segments 45 and 46 of the circuit board 40 is angled relative to the central axis A of the through hole H. In this embodiment, the tilt angle θ of the fifth and sixth segments 45 and 46 relative to the central axis A of the through hole H is ranged from 30 to 50 degrees (e.g. 40 degrees), but the invention is not limited to the embodiments described above.

Figure 12:
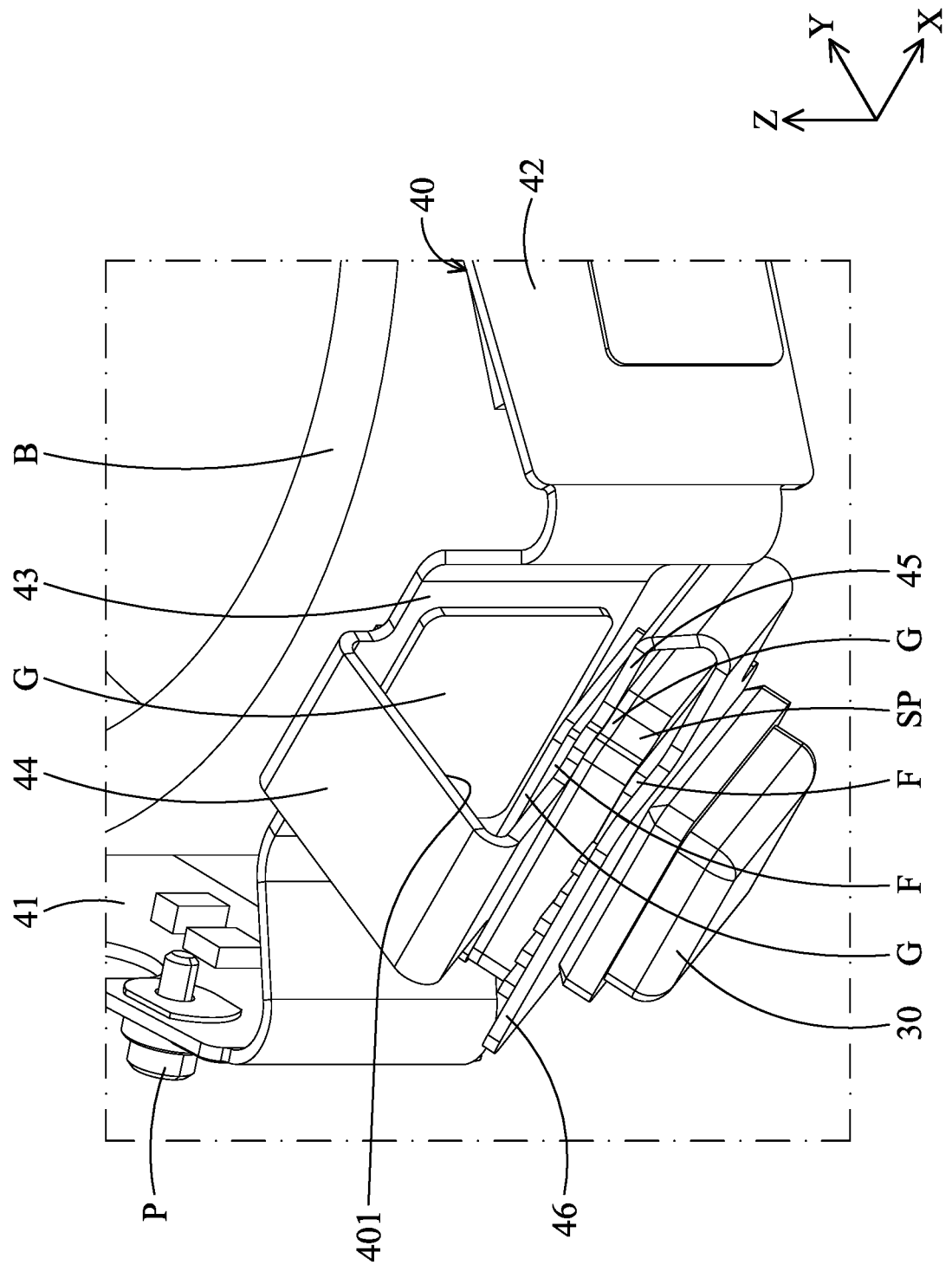
FIG. 12 is an enlarged perspective view showing a buffer SP disposed between the fifth and sixth segments 45 and 46.
Figure 13:
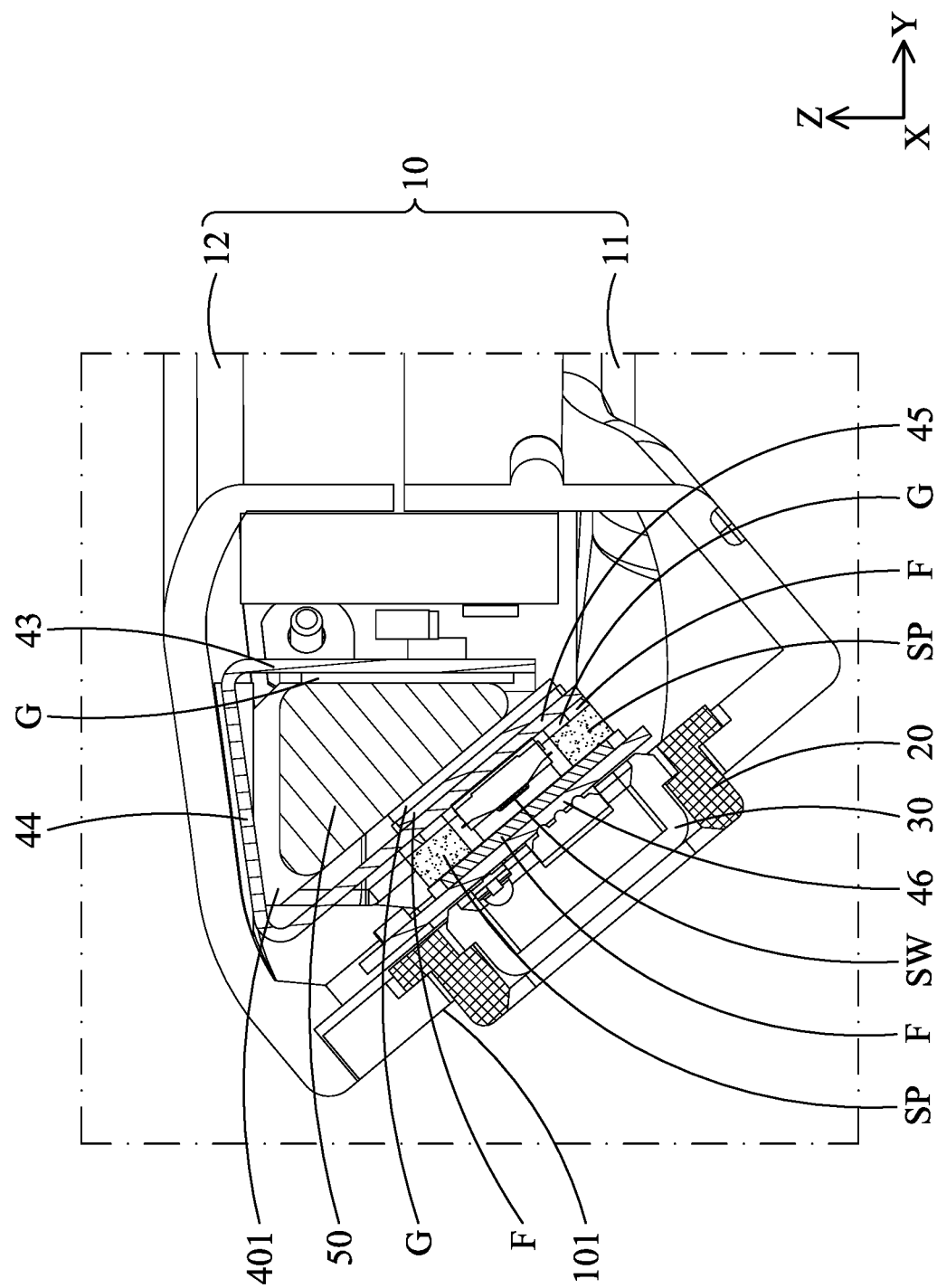
FIG. 13 is an enlarged cross-sectional view of the input device 100 after assembly.

FIG. 12 is an enlarged perspective view showing the buffer SP disposed between the fifth and sixth segments 45 and 46. FIG. 13 is an enlarged cross-sectional view of the input device 100 after assembly.

Referring to FIGS. 12 and 13, a buffer SP is disposed between the fifth and sixth segments 45 and 46 of the circuit board 40. Here, the buffer SP has a hollow structure that surrounds a switch element SW on the fifth segment 45.

In this embodiment, the buffer SP may comprise foam or rubber material, but the invention is not limited to the embodiments described above.

The buffer SP can be affixed to the fifth segment 45 of the circuit board 40 by the adhesive G (e.g. glue or double-sided tape). Additionally, a metal sheet F is disposed on the rear side of the sixth segment 46 of the circuit board 40, wherein the metal sheet F is connected between the buffer SP and the sixth segment 46, thus increasing the structural strength of the sixth segment 46 of the circuit board 40.

Similarly, another metal sheet F is disposed on the rear side of the fifth segment 45 to enhance the structural strength thereof. The metal sheet F can be affixed to the support 50 by the adhesive G (e.g. glue or double-sided tape), thus preventing the support 50 from sliding relative to the metal sheet F.

In this embodiment, the switch element SW may be a tactile switch. When performing the click function, the outer surface 101 of the first frame 11 can face the reference surface S (e.g. table surface) as shown in FIG. 1, and the user can press the reference surface S by the finger so that the reference surface S pushes the hollow movable member 20 back into the housing 10. In this state, the sixth segment 46 of the circuit board 40 and the optical module 30 are moved along with the movable member 20 toward the interior of the housing 10, and the switch element SW can be actuated to perform the click function.

Figure 14:
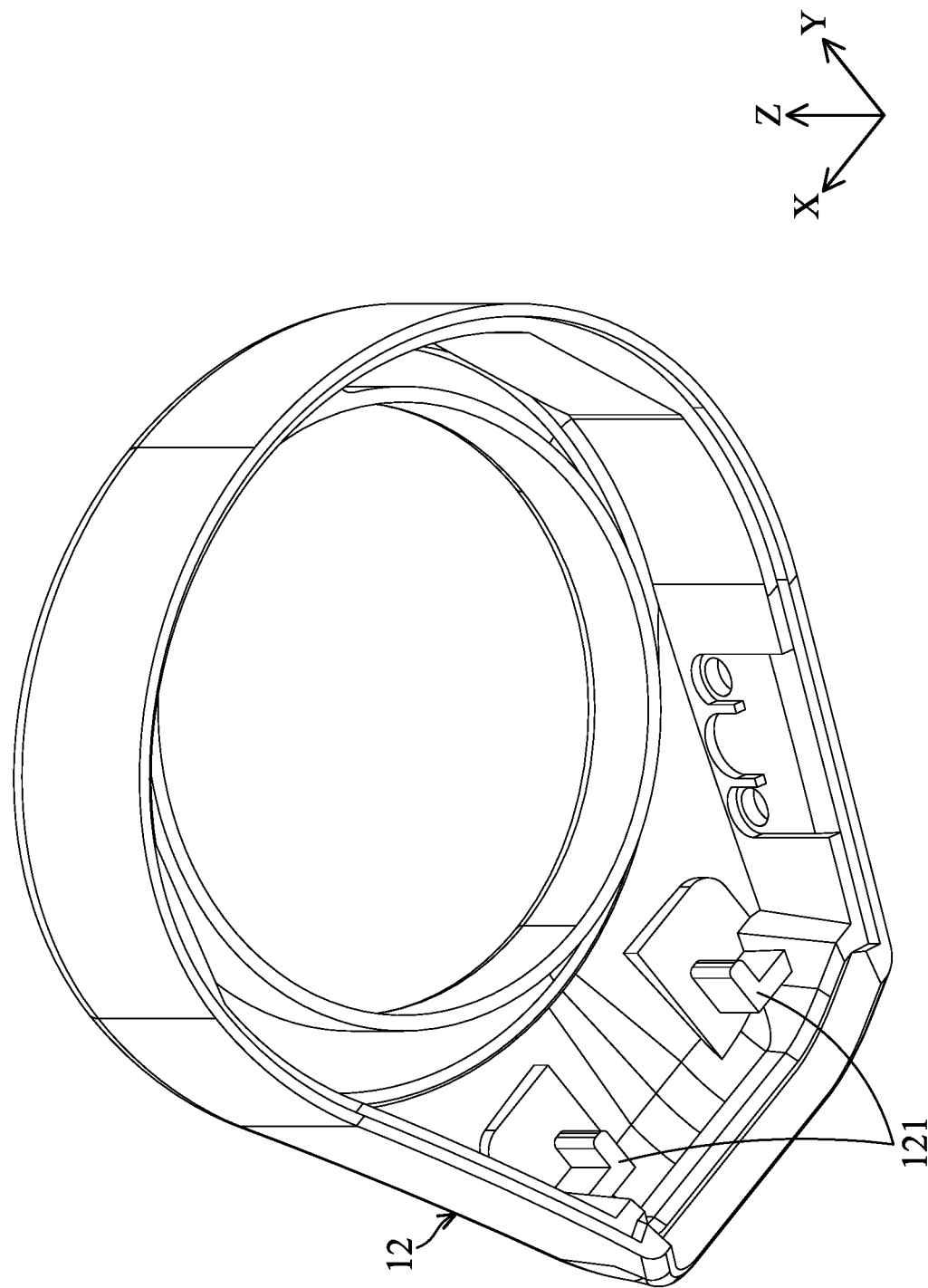
FIG. 14 is a perspective diagram of the second frame 12 that forms two L-shaped second joining portions 121.

FIG. 14 is a perspective diagram of the second frame 12 that forms two L-shaped second joining portions 121.

Referring to FIGS. 9 and 14, to achieve accurate positioning and tight connection of the support 50 inside the housing 10, each of the first joining portions 51 on the support 50 has an L-shaped structure (FIG. 9), and each of the second joining portions 121 on the second frame 12 has an L-shaped structure, corresponding to the first joining portions 51. During assembly, the second joining portions 121 can be joined to the first joining portions 51, whereby the circuit board 40 and the support 50 are firmly affixed in the housing 10.

Figure 15:
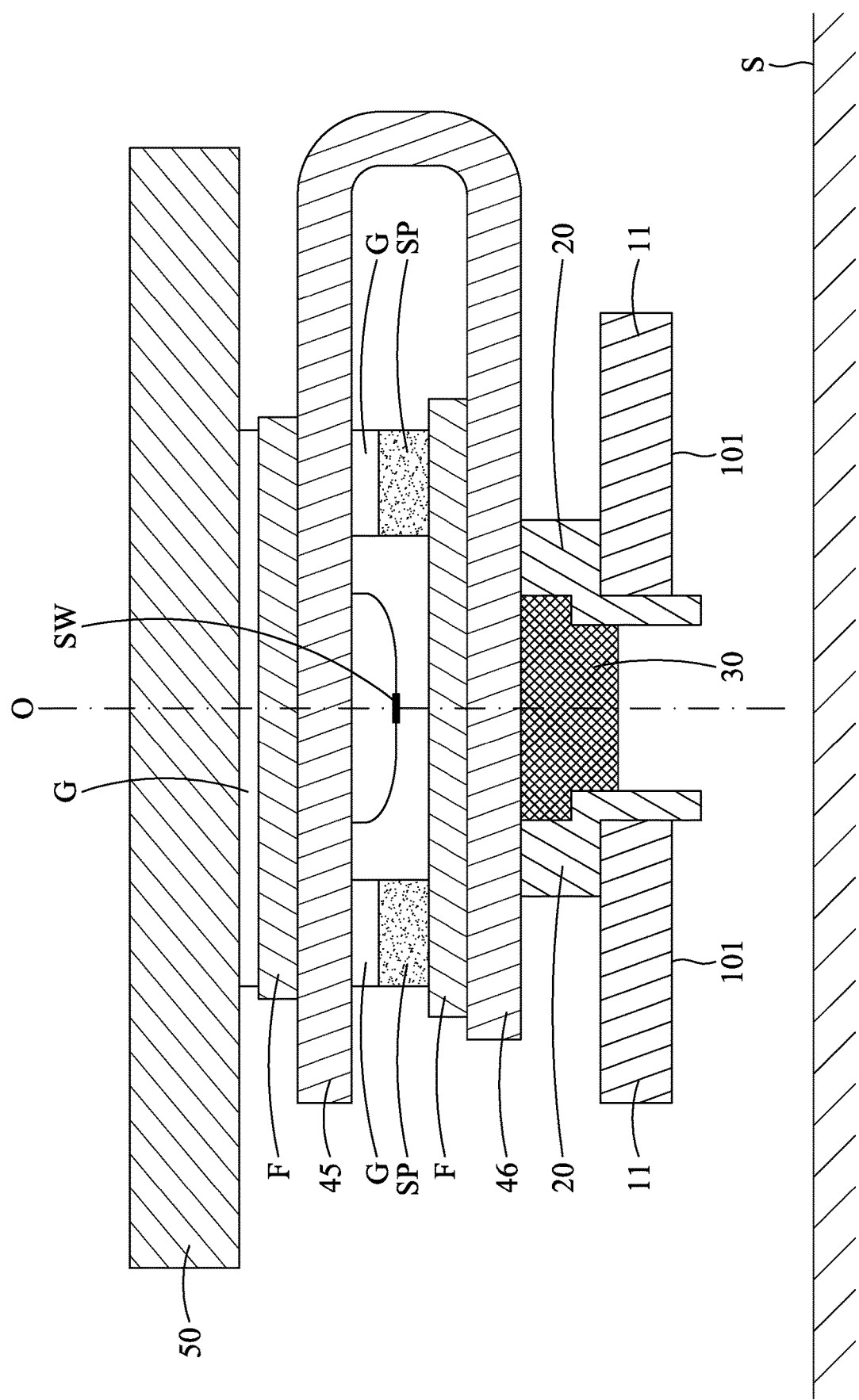
FIG. 15 is a cross-sectional view showing the input device 100 before it contacts the reference surface S.
Figure 16:
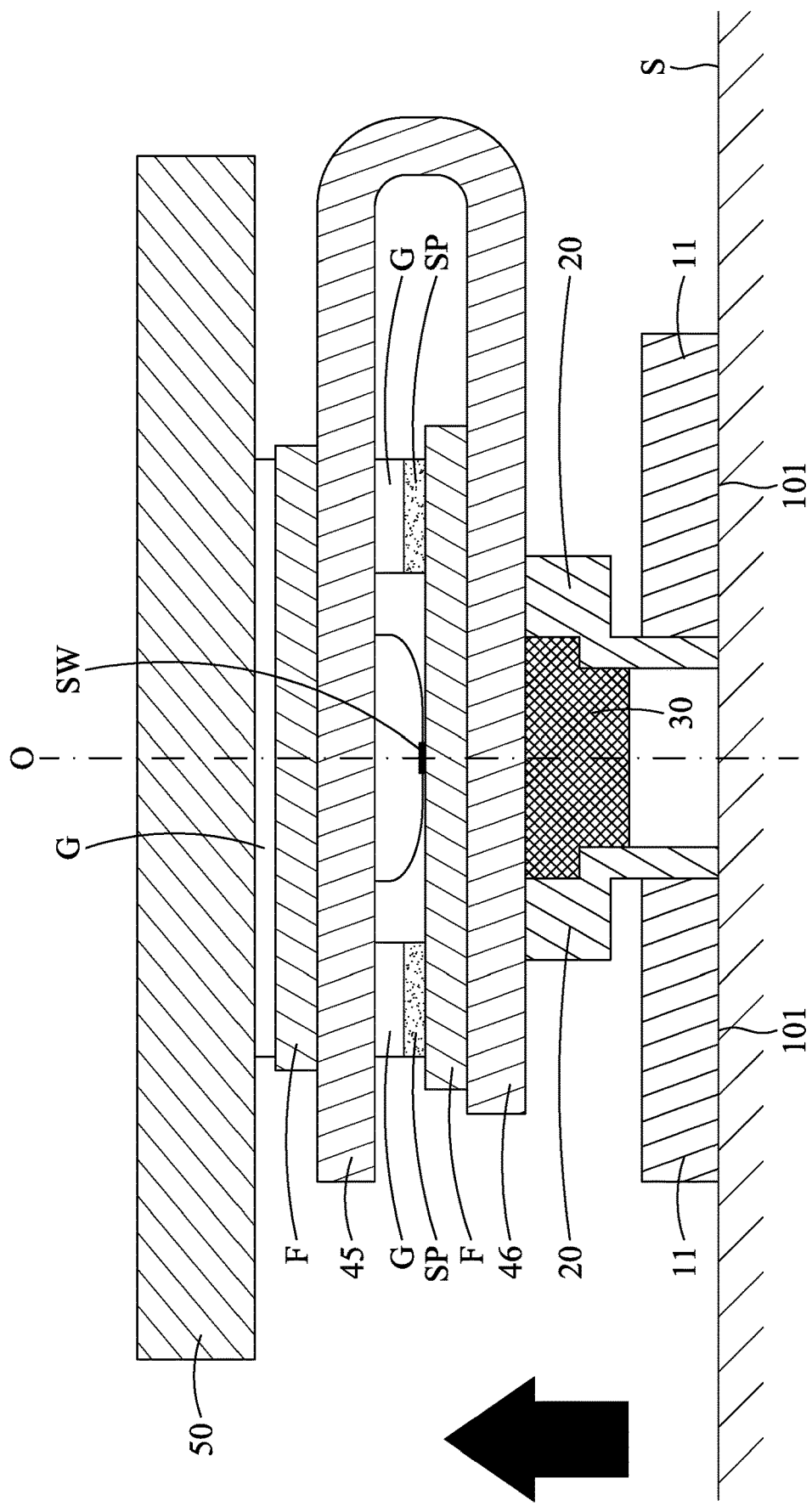
FIG. 16 is a cross-sectional view showing the movable member 20 of the input device 100 pressed by the reference surface S to actuate the switch element SW.

FIG. 15 is a cross-sectional view showing the input device 100 before it contacts the reference surface S. FIG. 16 is a cross-sectional view showing the movable member 20 of the input device 100 pressed by the reference surface S to actuate the switch element SW.

To perform the click function, as shown in FIG. 15, the input device 100 can be worn on the finger with the outer surface 101 of the first frame 11 facing the reference surface S (e.g. table surface).

Subsequently, as shown in FIG. 16, the user can move his/her finger so that the input device 100 contacts the reference surface S. While the movable member 20 contacts and presses the reference surface S, the movable member 20 is pushed by the reference surface S back into the housing 10. Hence, the sixth segment 46 of the circuit board 40 and the optical module 30 are moved along with the movable member 20 toward the interior of the housing 10, as the arrow indicates in FIG. 16.

In this state, the switch element SW can be actuated by the metal sheet F on the rear side of the sixth segment 46 of the circuit board 40 to perform the click function. It can be seen in FIGS. 15 and 16 that the optical module 30 has an optical axis O, and the switch element SW overlaps the optical module 30 when viewed along the optical axis O.

When the sixth segment 46 of the circuit board 40 and the optical module 30 move along with the movable member 20 toward the interior of the housing 10, the buffer SP between the fifth and sixth segments 45 and 46 of the circuit board 40 is compressed. While the finger and the input device 100 move away from the reference surface S, the buffer SP can recover to the original state as shown in FIG. 15 and push the movable member 20 to protrude from the outer surface 101 of the first frame 11.

In summary, the invention provides an input device 100 that can move a cursor on a computer screen. Specifically, the movable member 20 of the input device 100 protrudes from the outer surface 101 of the first frame 11, and it can be used as a button to perform the click function. Hence, the input device 100 is easy to use, and miniaturization of the input device 100 can also be achieved.

For example, the input device 100 may be a wireless ring mouse. However, in some embodiments, the input device 100 may also be applied to various wearable devices such as smart phones, smart watches, smart bracelet, smart rings, or AR glasses.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An input device, comprising:
a housing;
a circuit board, disposed in the housing;
an optical module, disposed on the circuit board for detecting the displacement of the input device relative to a reference surface;
a movable member, movably connected to the housing and protruding from an outer surface of the housing, wherein the optical module is affixed in the movable member; and
a switch element, disposed on the circuit board, wherein when the input device moves toward the reference surface and the movable member presses the reference surface, the movable member is pushed by the reference surface into the housing to actuate the switch element.

2. The input device as claimed in claim 1, further comprising a support, wherein the circuit board forms a triangular space for receiving the support.

3. The input device as claimed in claim 2, wherein the circuit board has a curved first segment, a curved second segment, a third segment, a fourth segment, a fifth segment and a sixth segment, the third segment is connected between the first and second segments, the fourth segment is connected between the third and fifth segments, and the sixth segment is connected to the fifth segment, wherein the triangular space is formed between the third, fourth, and fifth segments.

4. The input device as claimed in claim 3, wherein the sixth segment is parallel to the fifth segment, and the input device further comprises a buffer disposed between the fifth and sixth segments.

5. The input device as claimed in claim 3, wherein the support has a recessed portion for receiving the fourth segment of the circuit board.

6. The input device as claimed in claim 5, wherein the support further has two first joining portions, and the housing has two second joining portions respectively joined with the first joining portions, wherein the recessed portion is formed between the two first joining portions.

7. The input device as claimed in claim 2, wherein the circuit board comprises a flexible printed circuit board.

8. The input device as claimed in claim 1, wherein the optical module has an optical axis, and the switch element overlaps the optical module when viewed along the optical axis.

9. The input device as claimed in claim 1, wherein the housing forms a through hole, and the outer surface is angled relative to a central axis of the through hole.

10. The input device as claimed in claim 1, further comprising a C-shaped battery disposed in the housing and electrically connected to the circuit board.

* * * * *